No. 658,713.  
A. W. GRANT.  
DEVICE FOR APPLYING RUBBER TIRES TO VEHICLE WHEELS.  
(Application filed Feb. 7, 1898.)  
Patented Sept. 25, 1900.
(No Model.)
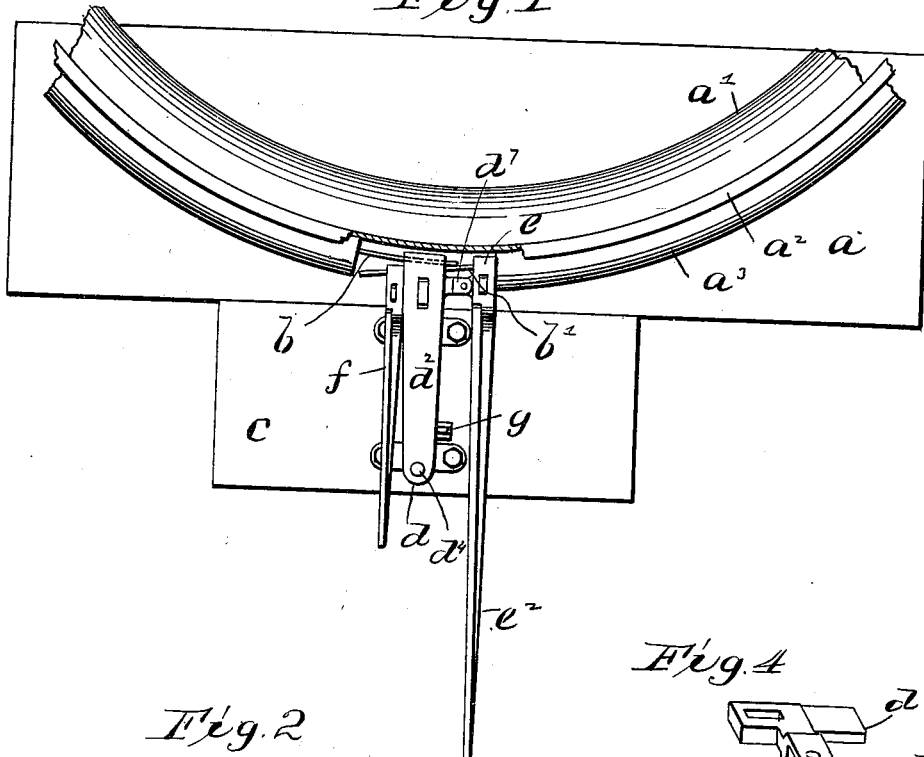
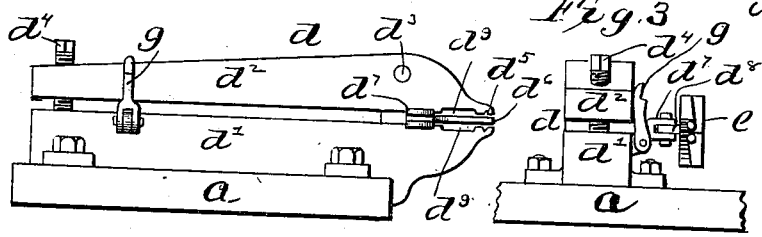 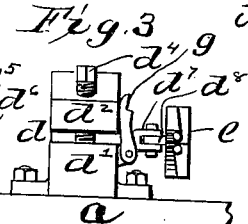 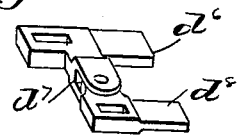
Witnesses  
G. M. Gridley  
Chas. I. Welch
Inventor  
Arthur W. Grant  
By his Attorney
THE NORRIS PETERS CO., PHOTO-LITHO., WASHINGTON, D. C.

UNITED STATES PATENT OFFICE.

ARTHUR W. GRANT, OF SPRINGFIELD, OHIO, ASSIGNOR, BY MESNE ASSIGNMENTS, TO THE CONSOLIDATED RUBBER TIRE COMPANY, OF JERSEY CITY, NEW JERSEY.

DEVICE FOR APPLYING RUBBER TIRES TO VEHICLE-WHEELS.

SPECIFICATION forming part of Letters Patent No. 658,713, dated September 25, 1900.

Application filed February 7, 1898. Serial No. 669,336. (No model.)

*To all whom it may concern:*

Be it known that I, ARTHUR W. GRANT, a citizen of the United States, residing at Springfield, in the county of Clark and State of Ohio, have invented certain new and useful Improvements in Devices for Applying Rubber Tires to Vehicle-Wheels, of which the following is a specification.

My invention relates to improvements in devices for applying rubber tires to vehicle-wheels; and it especially relates to that class of rubber tires in which the rubber is secured to the wheel-rim in a groove or channel by means of a metallic band or bands which are united together to form a continuous retaining band or bands, reference being had to my pending application, Serial No. 648,333.

The object of my invention is to provide a simple device by means of which the tires may be properly tightened in the channel and the ends of the retaining-bands held while they are being united within the channel or groove. I accomplish this by the devices shown in the accompanying drawings, in which—

Figure 1 is a plan view of a device embodying my invention. Fig. 2 is a side elevation, and Fig. 3 is an end elevation, of a portion of the same. Figs. 4 and 5 are detail views of some of the parts.

Like parts are represented by similar letters of reference in the several views.

In the said drawings, $a$ represents any suitable plate or table to support the wheel.

$a'$ is the wheel-rim.

$a^2$ is the metallic channel, and $a^3$ is the rubber in the channel.

$b$ and $b'$ represent the respective ends of the retaining band or bands.

Supported adjacent to the table $a$ is a bed-plate $c$, on which is mounted a stationary jaw or clamp $d$. This jaw or clamp is made of two parts $d'$ $d^2$, one of which is pivoted at $d^3$, and a clamping-screw $d^4$ is adapted to cause the ends of the jaws to engage at $d^5$ the retaining band or bands. In this case two such jaws are shown adapted to engage on opposite sides of a tongue $d^6$, placed between the jaws, so that two retaining-bands may be held thereby. This tongue $d^6$ is provided with a bifurcated extension $d^7$, to which is pivoted a similar tongue $d^8$, lying adjacent and parallel thereto, and to this tongue $d^8$ there are connected jaws $e$ and $e'$ of an auxiliary clamping device, which may be made in the form of tongs with backwardly-extending handles $e^2$, the jaws $e$ and $e'$ being adapted to engage on opposite sides of the tongue or projection $d^8$ to clamp the retaining bands or wires therein. The clamping device $d$ is preferably formed with openings $d^9$ on each side of the tongue $d^6$, and in the rear of the jaws $d^5$ and on the opposite side of said clamp $d$ from the auxiliary clamp there is a holding device $f$, which may be made very similar to the auxiliary clamp $e$—that is, in the nature of a pair of tongs having the jaws to clamp the retaining-wires. This holding device may be connected to the clamp $d$, or it may be entirely independent of and adapted to simply rest against the side of the same.

The operation of the device as thus described and the manner of securing a tire thereby are as follows: One end of the retaining band or bands $b$ will be clamped by the jaws $d^5$ on the clamping device $d$. The other ends will be passed through the openings $d^9$, so that they may be engaged by the holding device $f$. The auxiliary clamp $e$, being pivoted, may be caused to engage the band or bands $b'$ and then by moving the same laterally forcibly draw the band or bands through the rubber and press them through the openings $d^9$ in the clamping device $d$, the slack being taken up and held by the holding device $f$. This is repeated by successive operations—that is to say, by successively clamping the band $b$ by the auxiliary device $e$ and moving the same laterally until the rubber is sufficiently tight in the channel, after which the auxiliary device may be tightly clamped onto the end of the retaining-band by placing a holding-ring $e^3$ on the handles thereof or in any other manner, the surplus of the wire cut, and the ends united between the main clamping device $d$ and the auxiliary clamping device $e$ by the welding process or in any other suitable and well-known manner. While this is being done, it may be desirable to hold the auxiliary clamp $e$ against movement and against the strain of the retaining-bands. For this purpose a hinged latch $g$ may be employed on the main clamping device $d$ and adapted when lowered to contact with the side of the auxiliary clamping device and hold the same against lateral movement.

It should be noted that the jaws of the stationary clamping device, as well as those of the auxiliary tightening device, are reduced at their clamping ends, so as to enter the channel in which the tire is seated. This is essential in order to get the bands united together at the proper tension and at the proper location within the channel.

A device of this kind, it will be seen, is extremely simple and may be made quite effective in operation.

Having thus described my invention, I claim—

1. In a rubber-tire machine the combination with the stationary jaws having the intermediate tongue, the auxiliary clamping device also having an auxiliary tongue, said auxiliary clamping device being pivoted to permit a reciprocating movement to and from said stationary jaws as described, and clamping-faces on each side of each of said tongues, substantially as specified.

2. The combination with the stationary clamping device having the upper and lower jaws with the intermediate tongue, a projection on said tongue, an auxiliary clamping device having upper and lower jaws and an intermediate tongue, the intermediate tongues of each of said devices being pivoted together, substantially as specified.

3. In a rubber-tire machine the combination with the stationary clamping device consisting of the jaws having reduced ends and band-holding faces, an auxiliary clamping device also having reduced ends and band-holding faces, said auxiliary clamping device being pivoted to permit a reciprocating movement to and from said stationary clamping device and means for holding said auxiliary clamping device with its band-holding faces in substantial alinement with the band-holding faces of the stationary clamp, substantially as specified.

4. The combination with the stationary jaws having the means for clamping and unclamping said jaws, an auxiliary clamping device pivoted adjacent to said stationary jaws, said pivoted clamping device being in the nature of tongs with an extended handle to use as a lever to operate said pivoted clamping device to vary the distance between said clamping devices, means for holding said pivoted clamping device in a clamping position, and a movable stop on said stationary jaws to engage said auxiliary pivoted jaws and hold them against movement, substantially as specified.

5. The combination with the stationary jaws with means for clamping and unclamping the same, the auxiliary clamp in the nature of tongs having extended handles pivoted in proximity to said stationary jaws, said handles being used as a lever to vary the distance between said stationary and auxiliary clamps and a movable holding-clamp also having clamping-jaws adjacent to said stationary jaws, substantially as specified.

In testimony whereof I have hereunto set my hand this 26th day of January, A. D. 1898.

ARTHUR W. GRANT.

Witnesses:
   CHAS. I. WELCH,
   EARL G. WELCH.